United States Patent
Qiu

(10) Patent No.: US 9,310,796 B2
(45) Date of Patent: Apr. 12, 2016

(54) MULTI-DRIVER CONTROL METHOD AND APPARATUS THEREOF

(71) Applicant: Liquan Qiu, Wujiang (CA)

(72) Inventor: Liquan Qiu, Wujiang (CA)

(73) Assignee: DELTA ELECTRO-OPTICS (WUJIANG) LTD. (CN)

( * ) Notice: Subject to any disclaimer, the term of this patent is extended or adjusted under 35 U.S.C. 154(b) by 384 days.

(21) Appl. No.: 13/845,519

(22) Filed: Mar. 18, 2013

(65) Prior Publication Data

US 2014/0114446 A1 Apr. 24, 2014

(30) Foreign Application Priority Data

Oct. 18, 2012 (CN) .......................... 2012 1 0396090

(51) Int. Cl.
*G05B 19/05* (2006.01)
(52) U.S. Cl.
CPC .... *G05B 19/056* (2013.01); *G05B 2219/34288* (2013.01)
(58) Field of Classification Search
CPC ...... G05B 19/05; G05B 19/056; G05B 19/18; G05B 19/408; G05B 19/4086; G05B 2219/34288
USPC ....................................... 700/61, 86, 89, 275
See application file for complete search history.

(56) References Cited

U.S. PATENT DOCUMENTS

| 5,940,292 A | 8/1999 | Kurakake et al. |
| 6,401,011 B1 | 6/2002 | Hashimukai |
| 2004/0056626 A1 | 3/2004 | Fujinawa |
| 2013/0033218 A1* | 2/2013 | Yamada et al. ............... 318/567 |
| 2014/0058565 A1* | 2/2014 | Shimamura et al. .......... 700/275 |

FOREIGN PATENT DOCUMENTS

| CN | 102540965 | 7/2012 |
| JP | 2010-282419 | 12/2010 |
| TW | 385379 | 3/2000 |

* cited by examiner

*Primary Examiner* — Mohammad Ali
*Assistant Examiner* — Nathan L Laughlin
(74) *Attorney, Agent, or Firm* — Hauptman Ham, LLP

(57) ABSTRACT

A multi-driver control method and an apparatus thereof are disclosed in the present invention. The multi-axis control method comprises the following steps: providing a set of control curves, each curve of the set of control curves controls a driver respectively; dividing the curves by a set time period; sending the divided curves in the same time period to the corresponding drivers in one time period, and sending a unified beat signal to all the drivers in order to synchronize execution time of all the drivers; fitting and restoring a programmed motion curve of each driver according to all received divided control curves; taking points at each driver's own programmed motion curve, which is restored locally, of each driver to control the rotation of each driver's own motor.

10 Claims, 6 Drawing Sheets

# MULTI-DRIVER CONTROL METHOD AND APPARATUS THEREOF

TECHNICAL FIELD OF THE INVENTION

The present invention relates to a field of automatic control, and more particularly to a multi-driver control method and an apparatus thereof.

BACKGROUND OF THE INVENTION

A programmable logic controller (PLC) or a driver is often used to control a motor in traditional equipments. The drawbacks of the PLC are simple control processes, and low precision. With new development in recent years, new model equipments have complex operations, control accuracy, and consistency with multi-axis synchronization, as well as systematic control development in the technical field. So, there is a need for a motion control technology.

A motion control technology is comprehensive, and control process often includes three parts in a conventional technology, such as a PLC control, a bus control, and a driver control. Firstly, the PLC control is used for programming the task of multi-axis, the bus control responses to send integrated tasks of the multi-axis to all of motors, and the driver control refers to that all of the motors finish the final execution. How to ensure the precise approximation of final motion orbit to target curve in the PLC controller is very important in these control processes.

The approximation of the motion orbit to the target curve is generally realized by analog or pulse mode. But both the analog and the pulse mode have drawbacks of complex arrangement of wires, bad anti-interference ability, low control precision, and lack of controlling drivers with high precision.

SUMMARY OF THE INVENTION

To solve the above-mentioned drawbacks, an object of the present invention is to provide a multi-driver control method and an apparatus thereof.

In order to solve the above-mentioned problem, the present invention provides a multi-driver control method which comprises the following steps: providing a set of control curves, each curve of the set control curves controls a driver respectively; dividing the control curves by a set time period; sending the divided control curves in the same time period to the corresponding drivers in one time period, and sending a unified beat signal to all the drivers in order to synchronize execution time of all the drivers; fitting and restoring a programmed motion curve of each driver according to all received divided control curves; taking points at each driver's own programmed motion curve, which is restored locally, of each driver to control the rotation of each driver's own motor.

Optionally, the step of providing the control curves further comprises: providing a motion control program, an electronic cam curve, and a G-code program; modeling by programmable logic controller (PLC) to construct the corresponding control curves.

Optionally, the step of sending the divided control curves in the same time period to the corresponding drivers in one time period is further performed through a system bus.

Optionally, the step of sending a unified beat signal to all the drivers is further performed through a system bus to send to each driver.

Optionally, the step of taking points at each driver's own programmed motion curve, which is restored locally, of each driver to control the rotation of each driver's own motor.

The present invention further provides a multi-driver control apparatus, which comprises the following units: a curve generation unit, which is used to provide a set of control curves, each curve of the set control curves controls a driver respectively; a dividing unit, which is used to divide the control curves generated by the curve generation unit by a set time period; a sending unit, which is used to send the divided control curves in the same time period to the corresponding drivers in one time period, and sending a unified beat signal to all the drivers in order to synchronize execution time of all the drivers; curve programming unit, which is used to fit and restore a programmed motion curve of each driver according to all received divided control curves; control unit, which is used to take points at each driver's own programmed motion curve, which is restored locally, of each driver to control the rotation of each driver's own motor.

Optionally, the curve generation unit further comprises the following modules: a data providing module, which is used to provide a motion control program, an electronic cam curve, and a G-code program; a curve construction module, which is used to model with the data provided by the data providing module by programmable logic controller (PLC) to construct the corresponding control curves according to the data provided by the data providing module.

The advantages of the present invention are as follows: dividing the control curves densely and periodically and sending each task digitally, which can ensure the stability and timely of data transmission in complex environment, and sending each task digitally which can solve the problem of how to improve the control precision in the prior art; divide the control curves, and drivers' analyzing and control the received task precisely. The present invention can overcome the drawbacks of low control precision and lack of controlling drivers with high precision in the prior art.

Furthermore, all the axes can be connected with one data line by the bus technology, thereby solving the problem of complex arrangement of wires in the prior art, and the bus technology is used to define the normative physical layer and data linkage layer, and can further ensure the stability and timely of data transmission in complex environment.

DETAILED DESCRIPTION OF THE INVENTION

Embodiments of a multi-driver control method and an apparatus thereof by the present invention are described in detail with the following accompanying diagrams.

Firstly, embodiments of a multi-driver control method by the present invention are described with the following accompanying diagrams.

Figure 1:
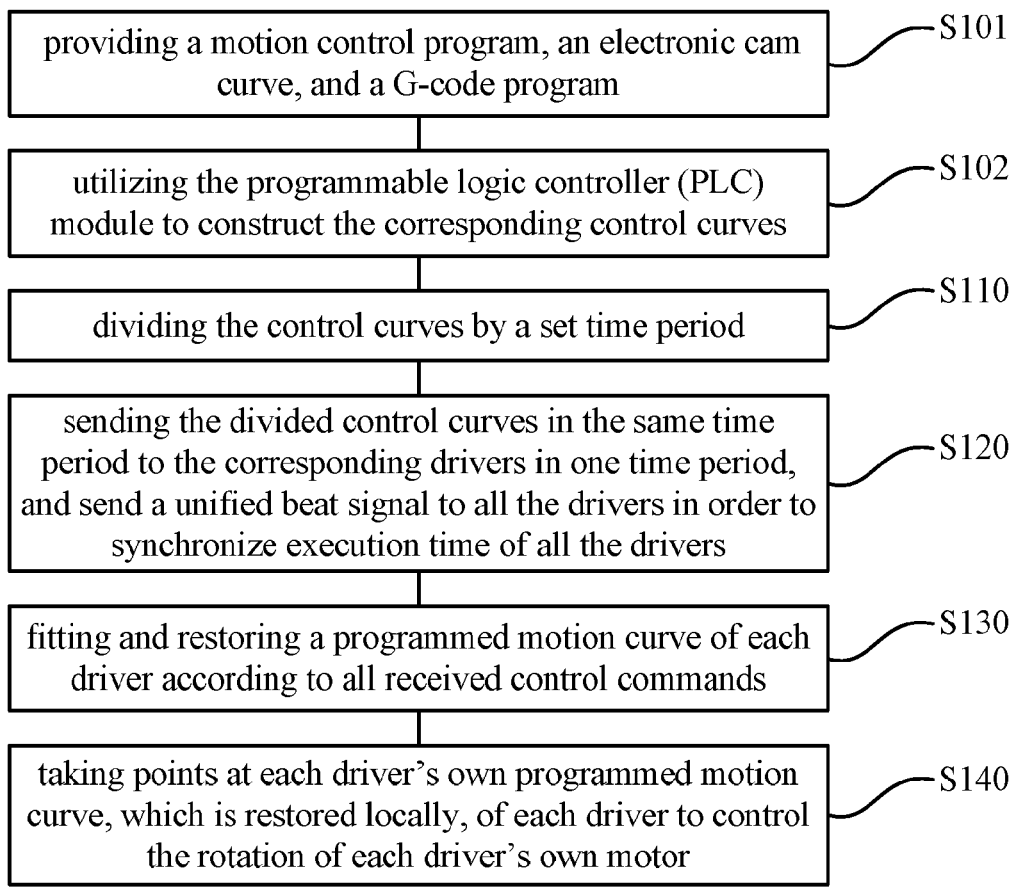
FIG. 1 illustrates a flow chart according to an embodiment Utile present invention.

FIG. 1 illustrates a flow chart according to an embodiment of the present invention, which comprises: a step S101, providing a motion control program, an electronic cam curve and a G-code program; a step S102, utilizing the programmable logic controller (PLC) module to construct the corresponding control curves; a step S110, dividing the control curves by a set time period; a step S120, sending the divided control curves in the same time period to the corresponding drivers in one time period, and send a unified beat signal to all the drivers in order to synchronize execution time of all the drivers; a step S130, fitting and restoring a programmed motion curve of each driver according to all received divided control curves; and a step S140, taking points at each driver's own programmed motion curve, which is restored locally, of each driver to control the rotation of each driver's own motor.

FIG. 2(a) to FIG. 2(d) illustrate schematic diagrams of operating the control curves using the method in the embodiment.

In the step S101, it is to provide a motion control program, an electronic cam curve, and a G-code program. The data mentioned above are original data which is commonly used for generating the motion control curves in a computer controlled filed, and other data which can generate the motion control curves should also be used in other embodiments.

In the step S102, it is to model by programmable logic controller (PLC) to construct the corresponding control curves. These control curves are used for programming motion orbits of the multi-axis by users.

Figure 2:
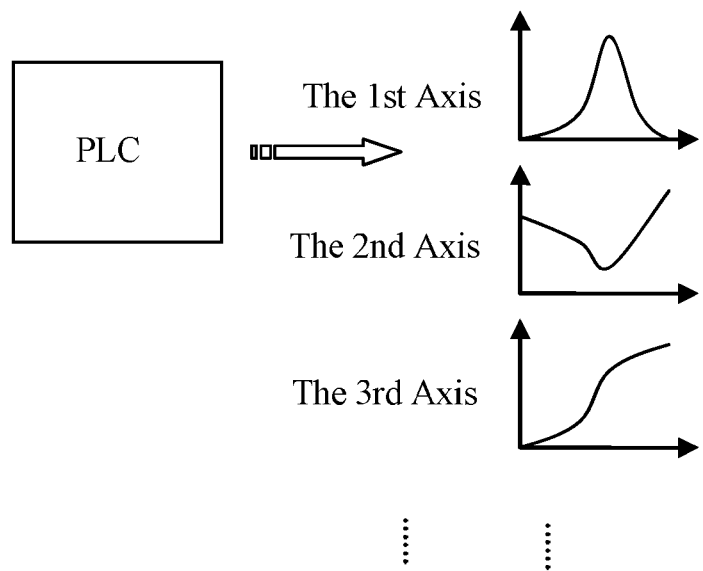
FIGS. 2(a) to 2(d) illustrate schematic diagrams of operating the control curves using the method shown in FIG. 1.
Figure 2:
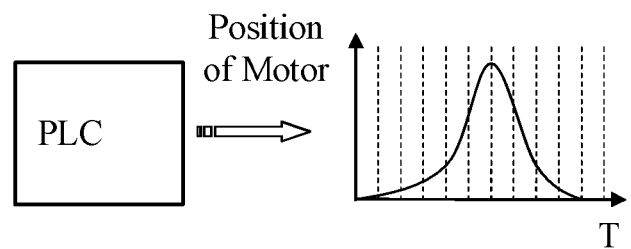
Figure 2:
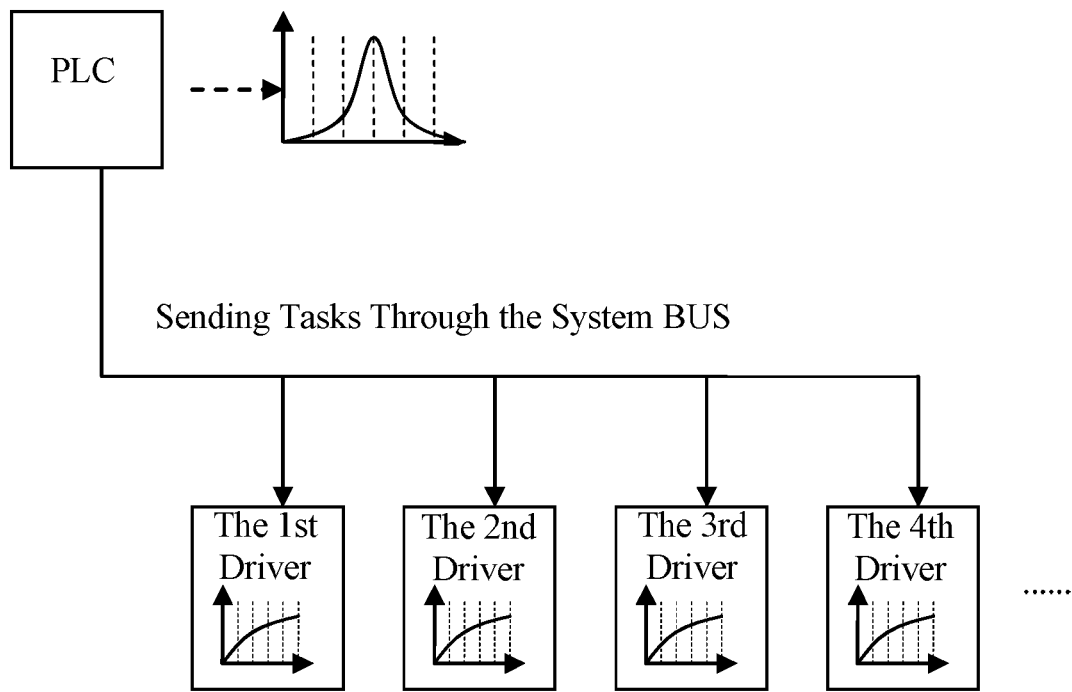
Figure 2:
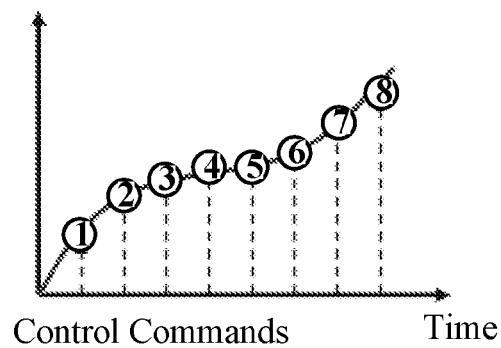

Please refer to FIG. 2(a) to clarify the step S101 and S102 mentioned above. The object of performing the steps above is to construct one set of control curves, and each curve of the set of control curves controls one driver respectively.

In the step S110, referring to FIG. 2(b), it is to divide the control curves by a set time period. FIG. 2(b) is drawn according to the first axis shown in FIG. 2(a). The dividing method of the other control curves can be taken by reference, and all the control curves should be divided with the same time period. The PLC can execute this step. Any control tasks are not sent to drivers, while the PLC divides the control curves densely and periodically in this step. Then, only the control tasks in the next time period will be sent to the drivers. Divide the control curves densely and periodically and sending each task digitally, which can ensure the stability and timely of data transmission in complex environment, and sending each task digitally which can solve the problem of how to improve the control precision in the prior art.

In the step S120, referring to FIG. 2(c), it is to send the divided control curves in the same time period to the corresponding drivers in one time period, and send a unified beat signal to all the drivers in order to synchronize execution time of all the drivers. The divided control curves in the same time period further send to the corresponding drivers in one time period through a system bus, and the unified beat signal sends to all the drivers in order to synchronize execution time of all the drivers through the system bus by broadcasting in this embodiment. In this step, using the control bus normatively, which can further ensure the stability and timely of data transmission in complex environment, and the time period control tasks of the multi-axis will be sent to the drivers in the fixed time section. By the system bus technology, connecting all the axes by one data line, which can solve the problem of complex arrangement of wires in the prior art, and the system bus technology is used to define the normative physical layer and data linkage layer, which can further ensure the stability and timely of data transmission in complex environment.

Figure 3:
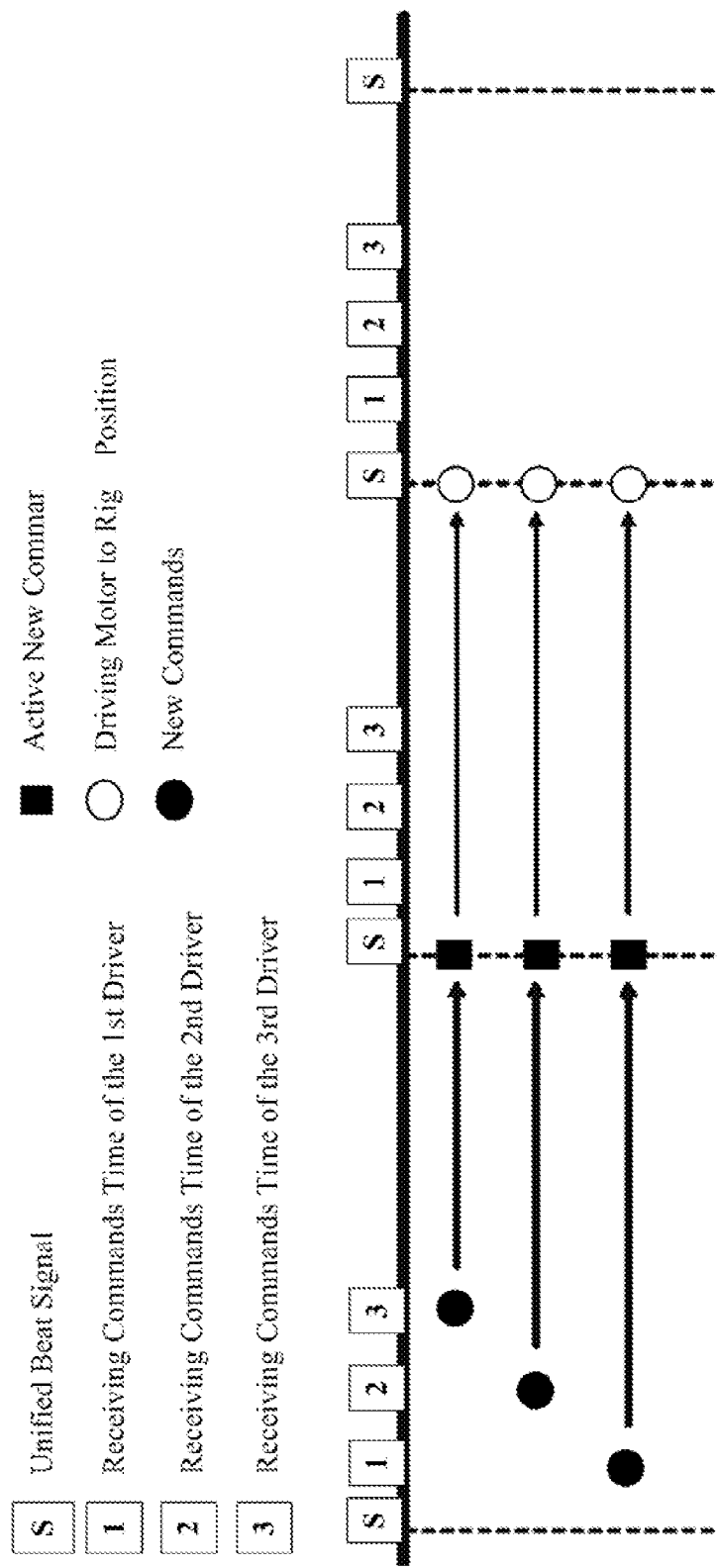
FIG. 3 illustrates a sequential diagram when performing a step S120 shown in FIG. 1.

FIG. 3 illustrates a sequential diagram when the step S120 is executed as shown in FIG. 1. The time period tasks will not be executed after arriving, while waiting for the beat signal sending by broadcasting, which can active the time period tasks arrived the drivers. An execution time for each time period task is time space of the two neighboring beat signals. The method mentioned above can realize the synchronize tasks among the multi-axis. A series of control commands in one time period will be send to the drivers, and all of the control commands will be active in same time, to realize the synchronization among the multi-axis.

In the step S130, referring to FIG. 2(d), it is to fit and restore the programmed motion curve of each driver according to all received divided control curves. The numbers on the control curves means the different time period in this figure. The drivers restore the programmed motion curves from the PLC according to the control curves of the neighboring time section, which mean the control commands sending to the drivers by PLC in each time section.

Figure 4:
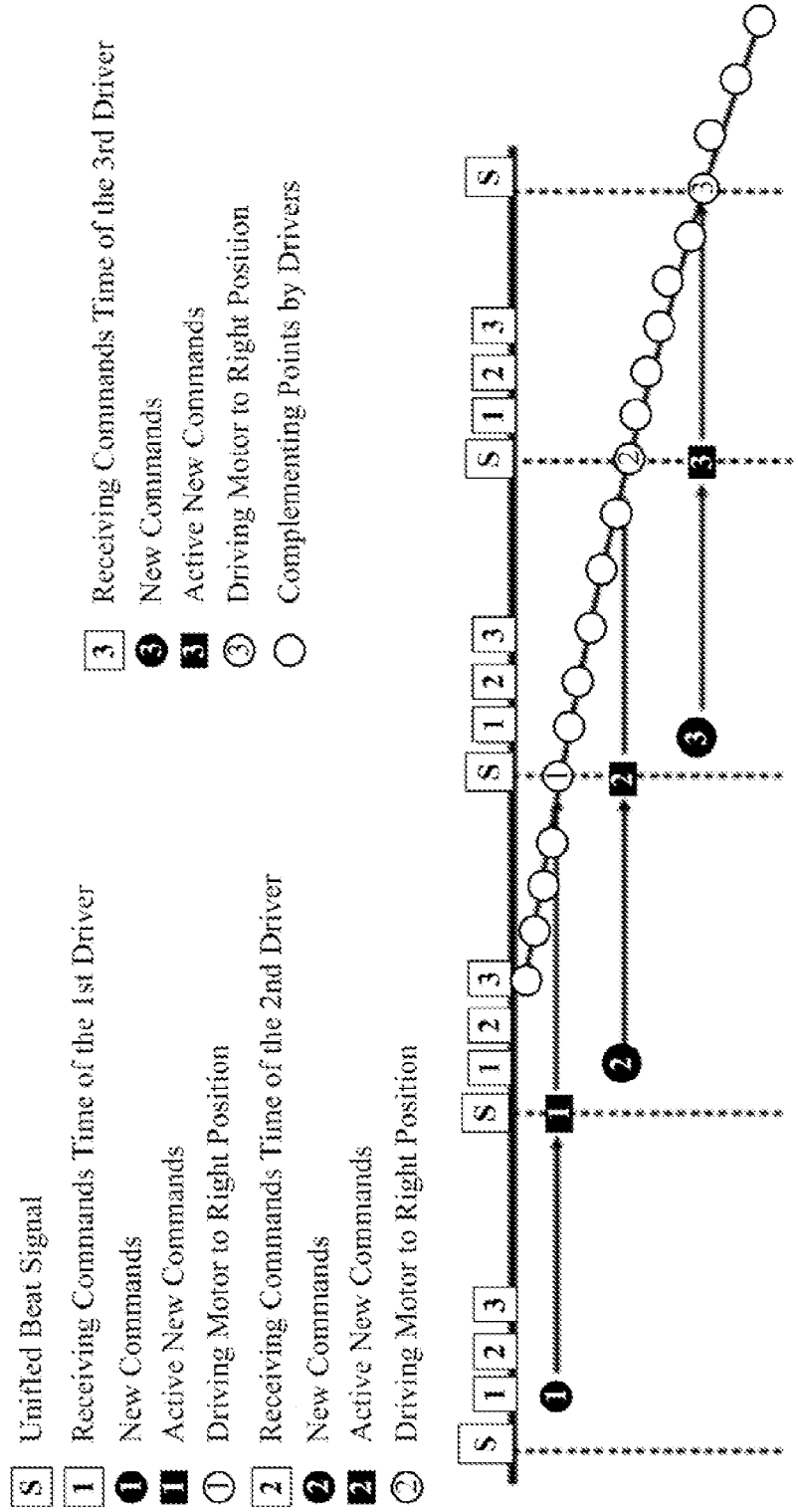
FIG. 4 illustrates a sequential diagram of the first driver corresponding to the first axis curve when performing a step S130 and a step S140 shown in FIG. 1.

In the step S140, it is to take points at each driver's own programmed motion curve, which is restored locally, of each driver to control the rotation of each driver's own motor. In this embodiment, the points are taken with the same time spaces at the programmed motion curve, and then the control curves generated by the PLC are restored in the drivers. The points are taken at the control curves with a time space, for example 125 ms, to control the motor. It can get uniformity between the control curves generated by the PLC and the real work of the motor. The drivers' analyzing and control the received task precisely, which can overcome the drawbacks of low control precision and lack of controlling drivers with high precision in the prior art FIG. 4 illustrates a sequential diagram of the first driver corresponding to the first axis curve when the step S130 and the step S140 are performing as shown in FIG. 1. The driver makes the control commands active according to the unified beat signal, restores the programmed motion curve of each driver according to all received divided control curves.

The advantages of the embodiments mentioned above are as follows: divide the control curves densely and periodically and sending each task digitally, which can ensure the stability and timely of data transmission in complex environment, and send each task digitally which can solve the problem of how to improve the control precision in the prior art; divide the control curves, and drivers' analyzing and control the received task precisely, which can overcome the drawbacks of low control precision and lack of controlling drivers with high precision in the prior art.

In the following, the embodiments of a multi-driver control apparatus by the present invention are described with the following accompanying diagrams.

Figure 5:
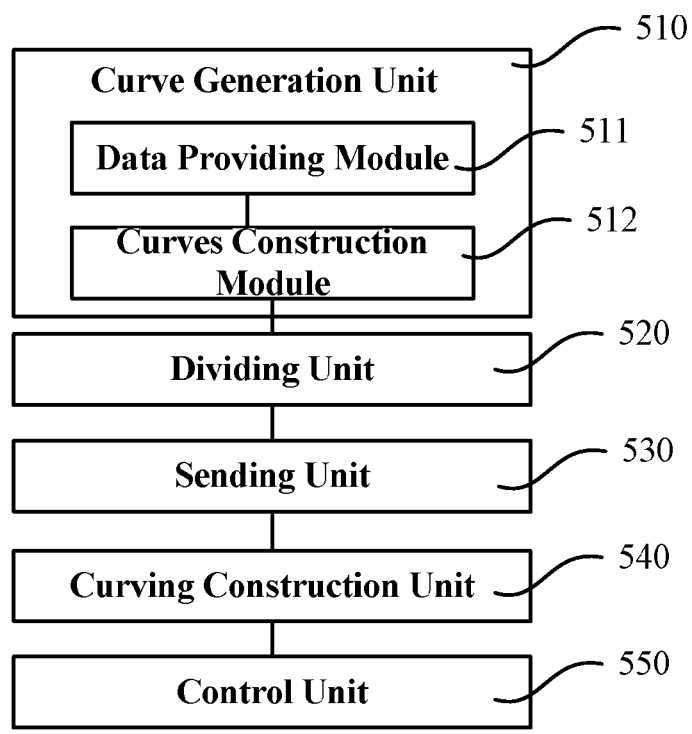
FIG. 5 illustrates a schematic structural diagram according to an embodiment of the present invention.

FIG. 5 illustrates a schematic structural diagram according to an embodiment of the present invention, which comprises the following units: a curve generation unit 510, which is used to provide a set of control curves, each one of the set of control curves controls a driver respectively; a dividing unit 520, which is used to divide the control curves generated by the control curves by a set time period; a sending unit 530, which is used to send the divided control curves in the same time period to the corresponding drivers in one time period, and send a unified beat signal to all the drivers in order to synchronize execution time of all the drivers; curve programming unit 540, which are used to fit and restore a programmed motion curve of each driver according to all received divided control curves; a control unit 550, which is used to take points at each driver's own programmed motion curve, which is restored locally, of each driver to control the rotation of each driver's own motor.

The curve generation unit 510 further comprises the following units: a data providing module 511, which is used to provide a motion control program, an electronic cam curve, and a G-code program; a curve construction module 512, which is used to model with the data provided by the data providing module by the PLC to construct the corresponding control curves according to the data provided by the data providing module 511.

Regarding to the relationship of the units and modules in this embodiment, please refer to the embodiments mentioned above, and it is omitted here.

The present invention has been disclosed as the preferred embodiments above, however, the above preferred embodiments are not described for limiting the present invention, various modifications, alterations and improvements can be made by persons skilled in this art without departing from the spirits and principles of the present invention, and therefore the protection scope of claims of the present invention is based on the range defined by the claims.

What is claimed is:

1. A multi-driver control method, which comprises the following steps:
   providing a set of control curves, each curve of the set of control curves controlling a driver respectively;
   dividing the control curves according to a set time period;
   sending the divided control curves in the same divided time period after division to the respective corresponding drivers in one time period, and sending a unified beat signal to each driver to synchronize execution time of each driver;
   fitting and restoring a programmed motion curve of each driver according to all received divided control curves; and
   taking points at the programmed motion curve, which is restored locally, of each driver to control the rotation of each driver's own motor.

2. The multi-driver control method of claim 1, wherein the step of providing the control curves further comprises:
   providing a motion control program, an electronic cam curve, and a G-code program; and
   modeling by a programmable logic controller (PLC) to construct the corresponding control curves.

3. The multi-driver control method of claim 1, wherein the step of sending the divided control curves in the same time period to the corresponding drivers in one time period is further performed through a system bus.

4. The multi-driver control method of claim 1, wherein the step of sending the unified beat signal to all the drivers is further performed through a system bus to send to each driver.

5. The multi-driver control method of claim 1, wherein the step of taking points at the programmed motion curve of each driver is to take the points with the same time spaces at the programmed motion curve.

6. A multi-driver control apparatus, comprising the following units:
   a curve generation unit, for providing a set of control curves, each one of the set of control curves controlling a driver respectively;
   a dividing unit, for dividing the control curves generated by the curve generation unit according to a set time period;
   a sending unit, for sending the divided control curves in the same time period to the corresponding drivers in one time period, and sending a unified beat signal to all the drivers in order to synchronize execution time of all the drivers;
   a curve programming unit, for fitting and restoring a programmed motion curve of each driver according to all received divided control curves; and
   a control unit, for taking points at the programmed motion curve, which is restored locally, of each driver to control the rotation of each driver's own motor.

7. The multi-driver control apparatus of claim 6, wherein the curve generation unit further comprises the following modules:
   a data providing module, for providing a motion control program, an electronic cam curve and a G-code program; and
   a curve construction module, for modeling by programmable logic controller (PLC) to construct the corresponding control curves according to the data provided by the data providing module.

8. The multi-driver control apparatus of claim 6, wherein the sending unit further sends the divided curves in the same time period to the corresponding drivers through a system bus.

9. The multi-driver control apparatus of claim 6, wherein the sending unit further sends the unified beat signal to all the drivers through a system bus.

10. The multi-driver control apparatus of claim 6, wherein the curve programming units further takes the points with the same time spaces at the programmed motion curve.

* * * * *